United States Patent [19]

Suzuki et al.

[11] Patent Number: 4,538,994

[45] Date of Patent: Sep. 3, 1985

[54] TRAINING SIMULATOR FOR TRAINING AN OPERATOR IN THE OPERATION OF AN ELECTRIC POWER SYSTEM

[75] Inventors: Mamoru Suzuki, Tokyo; Hiromoto Tanaka, Hyogo, both of Japan

[73] Assignees: The Tokyo Electric Power Company Inc.; Mitsubishi Denki Kabushiki Kaisha, both of Tokyo, Japan

[21] Appl. No.: 552,350

[22] Filed: Nov. 16, 1983

[30] Foreign Application Priority Data

Nov. 17, 1982 [JP] Japan ................................ 57-201515

[51] Int. Cl.³ ............................................... G09B 9/00
[52] U.S. Cl. .................................................... 434/219
[58] Field of Search ........................ 434/219, 224, 366

[56] References Cited

U.S. PATENT DOCUMENTS 3,237,318 3/1966 Schager ............................... 434/219
3,823,490 7/1974 Konik et al. ........................ 434/219

Primary Examiner—William H. Grieb
Attorney, Agent, or Firm—Bernard, Rothwell & Brown

[57] ABSTRACT

A training simulator for selecting one of the training items of simulation bases to be executed by the operation on a trainer console, requesting responsive operation on a trainee console, of reviewing the training from the beginning thereof when a first command to review the executed training item is given through the operation of the trainer console, and of executing another selected training item upon receiving a second command to convert the training item during the review operation of the preceding training item.

3 Claims, 5 Drawing Figures

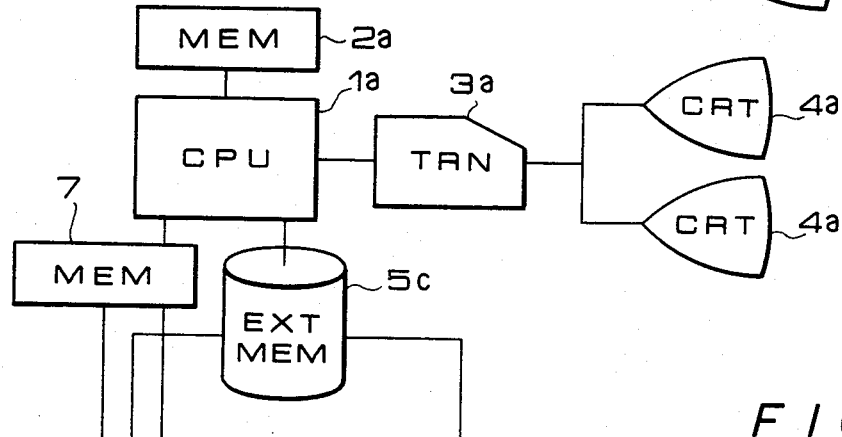
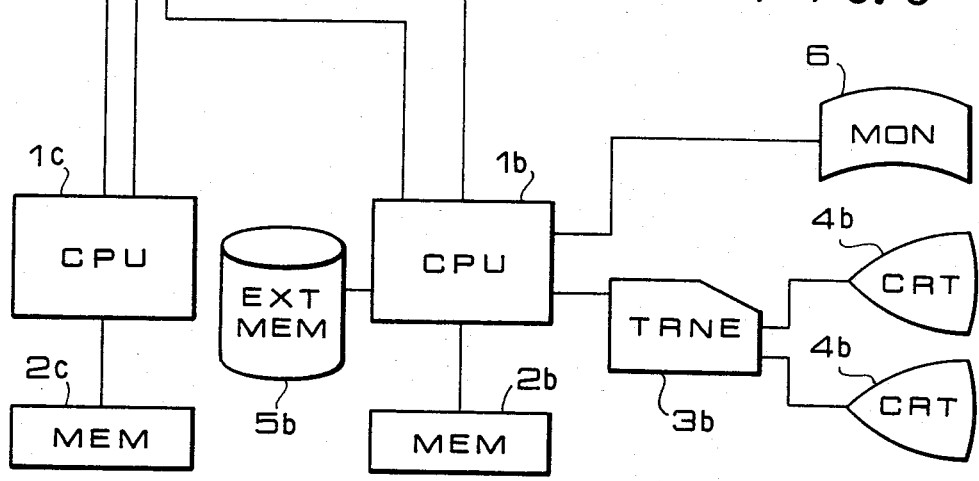
F I G. 3

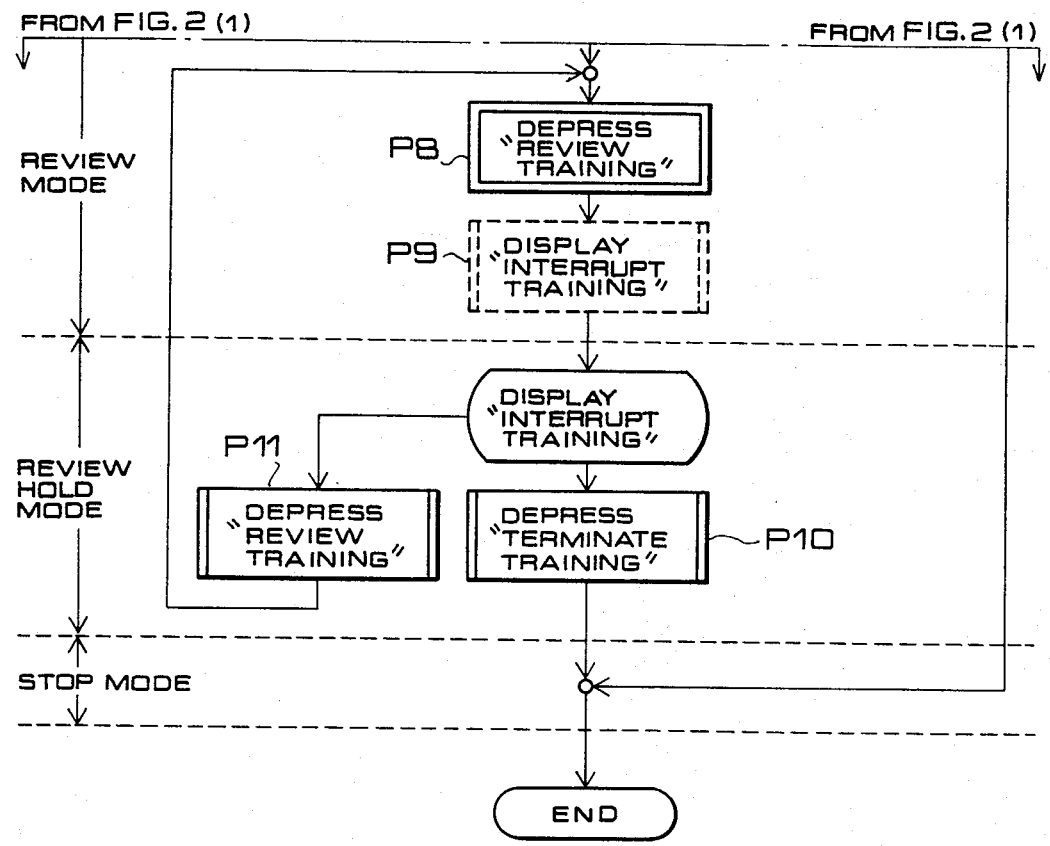
FIG. 2 (2)
(PRIOR ART)

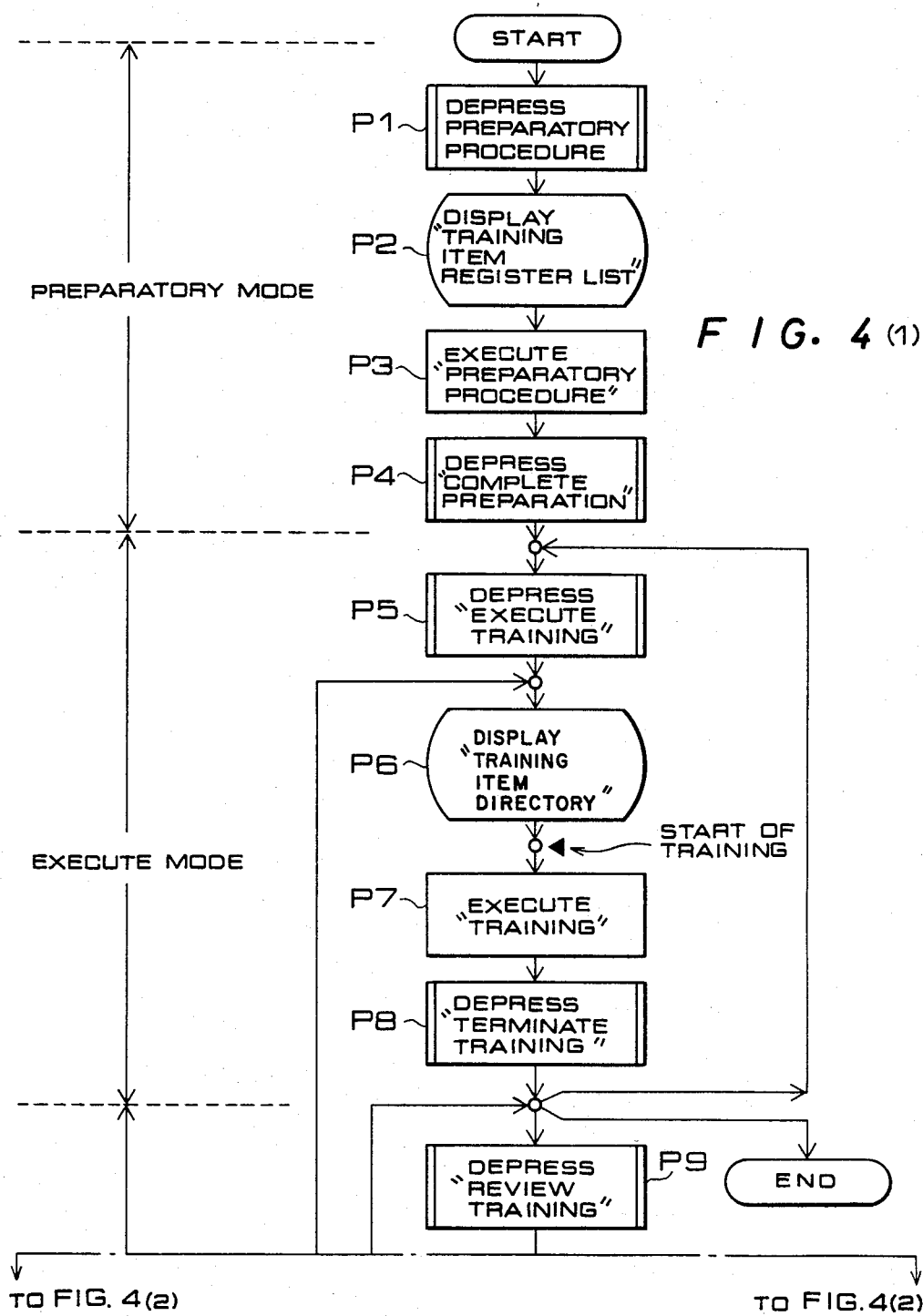
FIG. 4 (1)

TRAINING SIMULATOR FOR TRAINING AN OPERATOR IN THE OPERATION OF AN ELECTRIC POWER SYSTEM

FIELD OF THE INVENTION

The present invention relates to a computer-aided simulator and more particularly to a simulator for training an operator of a plant such as an electric power system.

BACKGROUND OF THE INVENTION

The operators working in the load-dispatching office or the like of a power company are required to be well-trained so that they are ready to take appropriate measures when accident occurs, not to mention in the routine operation of the power system.

A conventional training simulator for training such operator is shown in FIG. 1 wherein a central processing unit (CPU) 1 comprised of a digital computer, a main storage (MEM) 2, a trainer console (TRN) 3a, a trainee console (TRNE) 3b, character display units (CRT) 4a connected to the trainer's console character display units (CRT) 4b connected to the trainee's console, an external memory (EXT MEM) 5a and a system monitoring unit (MON) 6.

The operation of the simulator will be described with reference to FIG. 2 in the case of performing training. A trainer operates setting operations via the console 3a and the character display unit 4a to generate a training pattern and its registration. In order to execute actual training, the trainer console is operated to give a command "EXECUTE TRAINING" (Steps P1 and P2) to establish the execution mode of the simulator. During the execution mode, the training may be terminated by the depression of a "TERMINATE TRAINING" button on the trainer console at an appropriate time. The training can be interrupted upon the depression of an "INTERRUPT TRAINING" button on the trainer console (This mode is designated as an execution interrupt mode) (Step P4). The training can be terminated during the execution interruption mode (Step P3). The depression of a "REVIEW TRAINING" button causes the simulator to review the contents of the training from the start (This mode is designated as a review mode) (Step P6). The looping to the execution mode (Step P2) is attained by the depression of an "EXECUTE TRAINING" button (Step P7). In the review mode, the review of the training can be interrupted upon the depression of an "INTERRUPT REVIEW" button on the trainer's console. This mode is designated as a review interrupt mode (Steps P8 and P9). During the review interrupt mode, the training can be terminated upon the depression of a "TERMINATE TRAINING" button on the trainer console (Step P10). The depression of the "REVIEW TRAINING" button on the trainer console (Step P11) enables the restart of the training (repetition of Step P8) from the point of interruption.

Such a simulator has a disadvantages that it can not convert the mode of training into a new training situation from a state at the review being initiated after the interruption of review during the training review mode (Step P9), and hence it is impossible to execute repeated training focussed on a situation with which erroneous decision has been made or an inappropriate measure has been taken. The conventional training simulator has a further disadvantage that it cannot take a training by using an exemplary pattern of an important situation during the review of the training.

OBJECTS OF THE INVENTION

It is, therefore, an object of the present invention to provide a training simulator capable of restarting a training from a specified time and scene of the interrupted part thereof after the review of the training has been interrupted at an arbitrary time.

Another object of the present invention is to provide a training simulator for effectively training a trainee through the repetition of a particular training pattern.

It is a further object of the present invention to provide a training simulator capable of converting a training pattern at an arbitrary time during the review of the training pattern into another training pattern.

It is still further object of the present invention to provide a training simulator capable of training a trainee with an exemplary training pattern.

SUMMARY OF THE INVENTION

A training simulator according to the present invention has an arrangement for performing one of a plurality of training items on simulation bases through a selective operation on a trainer console to request corresponding operation on a trainee console, whereby if a review command is generated for current item from the trainer console, the training from the starting point of item is executed, and if further command is given for changing the training item while executing the reviewed item, another selected item is executed therefrom.

BRIEF DESCRIPTION OF THE DRAWINGS

FIG. 3 is a block diagram showing the systematic configuration of a training simulator according to the present invention;

DETAILED DESCRIPTION OF THE INVENTION

Figure 1:
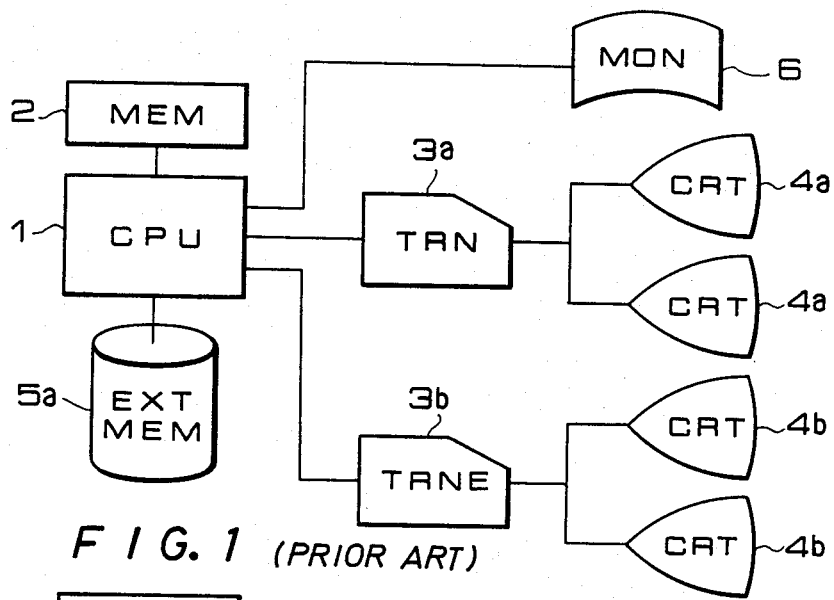
FIG. 1 is a block diagram showing the systematic configuration of a conventional training simulator.
Figure 2:
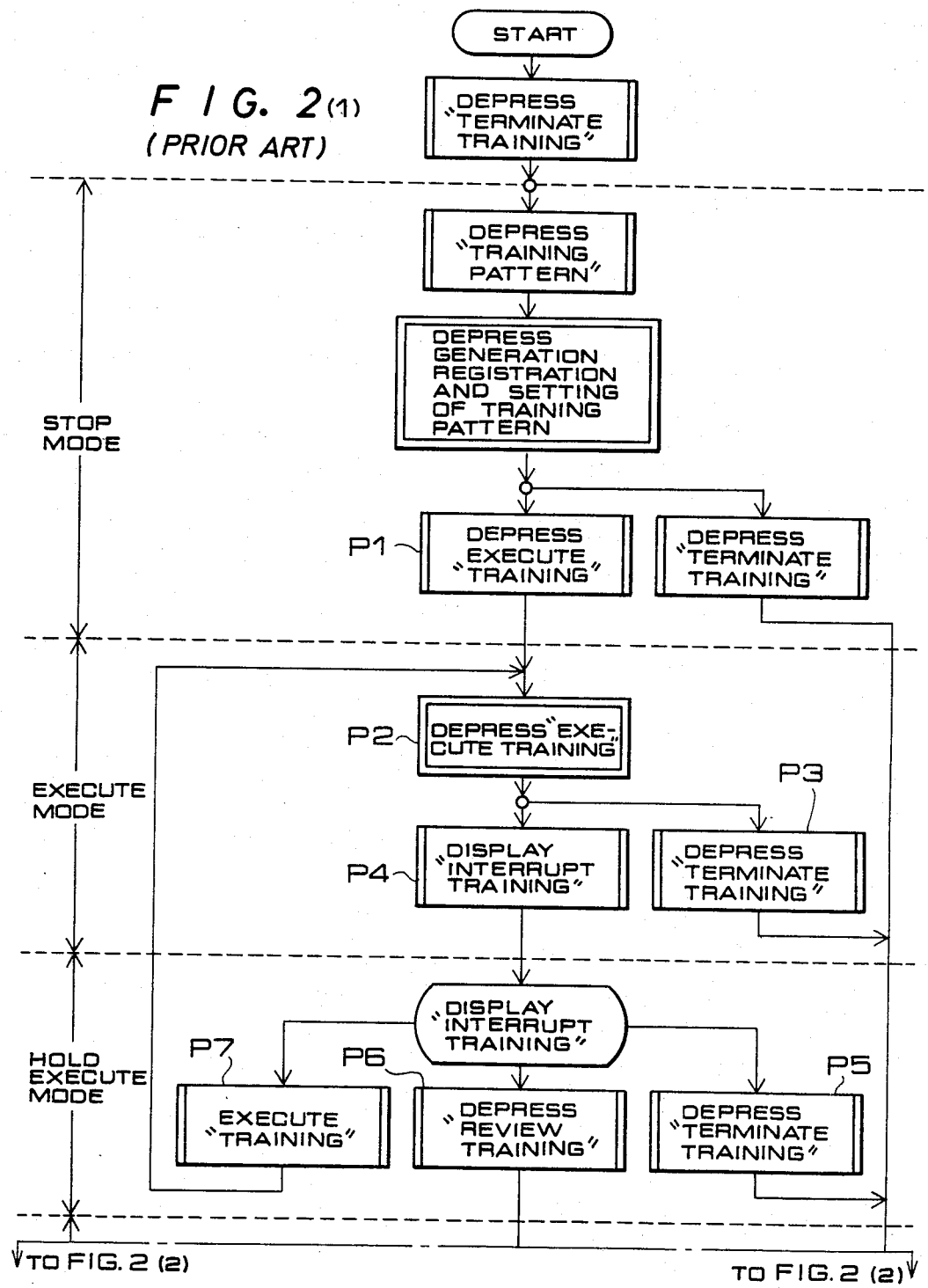
FIG. 2 is a flow chart of the operation of the training simulator of FIG. 1.

Referring now to FIG. 3 which shows a systematic configuration of a training simulator according to the present invention, wherein like or the corresponding elements with FIG. 1 are designated by the same reference numerals except that reference characters "a", "b" and "c" are affixed to some reference numerals, there are shown a central processing unit (CPU) 1a including a digital computer adapted to function according to the operation of a trainer, a central processing unit 1b including a digital computer adapted to function according to the operation of a trainee, a central processing unit 1c including a digital computer adapted to simulate the various modes of a power system and various plants, main storages 2a and 2b, memory 2c, a trainer console 3a, character displays 4a connected to the trainer console, an external memory 5b, a shared main storage 7 which is accessible by each CPU, a trainee console 3b, character displays 4b connected to the trainee console, a network monitoring unit 6, and an external storage 5c which is accessible by each CPU. The character displays 4a and 4b are capable of displaying data on the screens for selectively reading it via an indication of a light pen attached thereto.

Figure 4:
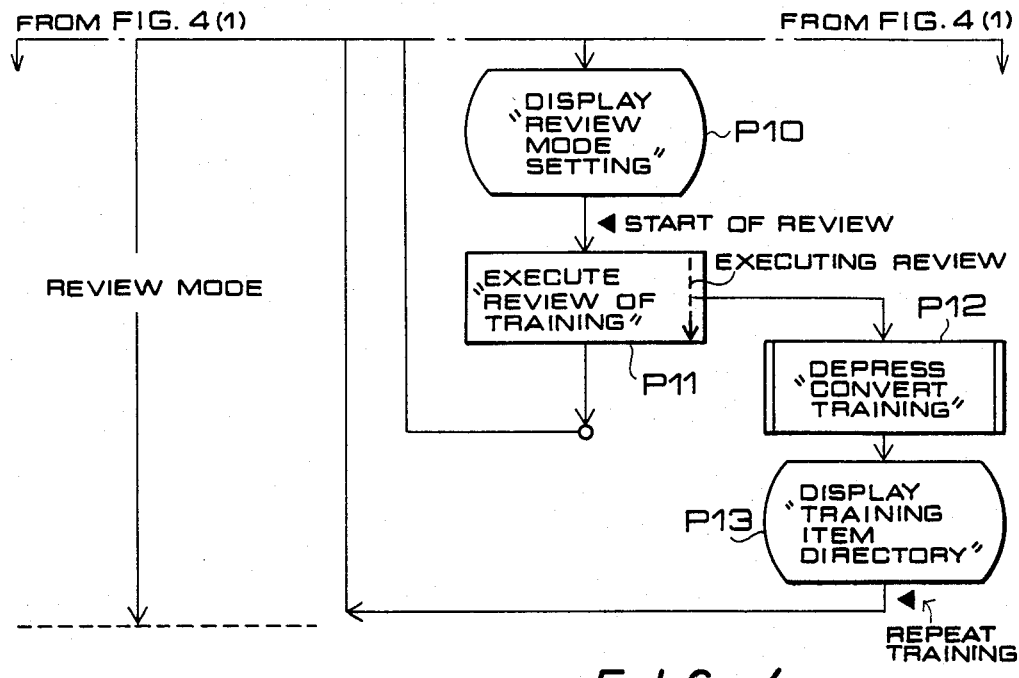
FIG. 4 is a flow chart of the operation of the training simulator of FIG. 3.

The operation of the training simulator of the present invention will now be described in reference with FIG. 4.

Firstly, a training pattern is generated and registered (this procedure is designated as "preparatory procedure") by using the trainer console 3a and the character displays 4a (Steps P1, P2 and P3). The completion of the preparatory procedures is executed by depressing "COMPLETE PREPARATION" button (Step P4). In order to take actual training an "EXECUTE TRAINING" command is provided through the operation on the trainer console (Step P5), whereby the execution mode of the training simulator is established (Steps P6 and P7). During the execution mode, the trainer is able to terminate the current training item at an appropriate time by depressing a "TERMINATE TRAINING" button on the trainer console (Step P8). When the review of the training is required after the termination of the training, the training is reviewed from the beginning thereof (Step P11) by depressing a "REVIEW TRAINING" button (Step P9) to display a "REVIEW MODE SETTING" on the displays 4a (Step P10), and a "START REVIEW" command is given by means of a light pen. A "CONVERT TRAINING" button provided in the trainer console is depressed when it is desired to restart the training of the execution mode at a suitable time during the repetition of the training. At this time, the current training status, such as the conditions of the network of plant, time and the conditions of the trainer and the trainee, are deposited. When the "CONVERT TRAINING" button is depressed, a "TRAINING ITEM DIRECTORY" is displayed on the character display 4a (Steps P12 and P13). When a command "REPEAT TRAINING" included in the directory displayed on the character displays 4a is given by means of a light pen, the training simulator starts from the instant of the depression of the "CONVERT TRAINING" button to be returned to the execution mode, so that the training simulator is able to perform training operation for new situation. If the "CONVERT TRAINING" button is depressed, the operation is returned to Step P9 and the training (Step 9 to Step P11) is repeated until the "TERMINATE TRAINING" button is depressed. When the "EXECUTE TRAINING " button is depressed thereafter, a new training item can be performed (Step P5) or the same training situation can be reviewed. When the "CONVERT TRAINING" button is depressed (Step P12) to execute the training from the part midway in the review of the training (Steps P6 and P7), the present training can be terminated through the depression of the "TERMINATE TRAINING" button (Step P8). After the termination of the training, the training contents during review which is interrupted to change to the execution mode, namely, the most update training contents, can be reviewed through the depression of the "REVIEW TRAINING" button (Step P9). It is also possible to execute a new training item (Step P5) through the depression of the "EXECUTE TRAINING" button (Step P5).

Figure 5:
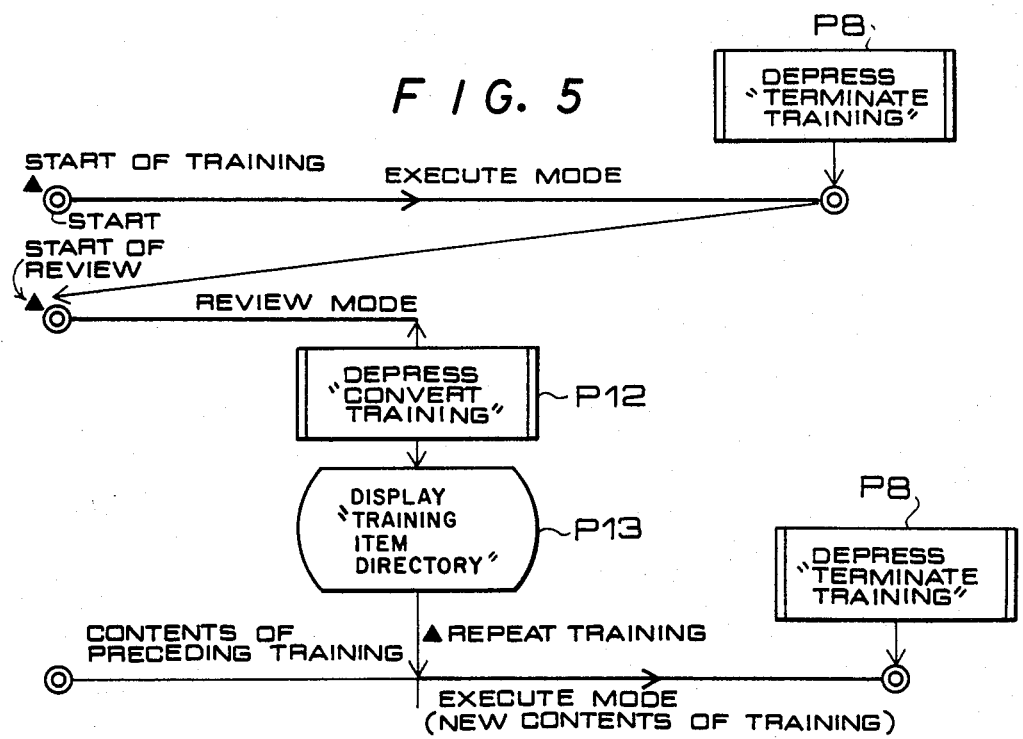
FIG. 5 is a flow chart showing transitional operation of the training simulator of FIG. 3.

FIG. 5 shows a flow chart of the transitional operation of the simulator. It is clear that FIG. 5 is a modification of the flow chart of FIG. 4, intended to facilitate the understanding particularly of the mode transition, therefore, the same description as that made hereinbefore in connection with FIG. 4 applies.

Although the embodiment of the present invention described hereinbefore does not have the execution interruption mode for interrupting the training execution mode, with which the conventional training simulator is provided, it is possible to provide the embodiment with an additional system in which an "INTERRUPT TRAINING" button is depressed to display a "TRAINING ITEM DIRECTORY" on a display to convert into the execution interrupt mode, and then a "CONTINUE TRAINING" is designated on the "TRAINING ITEM DIRECTORY" with a light pen to continue the training.

What is claimed is:

1. A training simulator for training an operator in the operation of an electric power system comprising:
    trainer input-output means having a plurality of pushbuttons respectively corresponding to a plurality of training items regarding training simulation for manually selecting one of said items to be subsequently executed;
    trainee input-output means to enter proper data in response to simulated conditions provided through the execution of the selected training item; and
    a first central processing unit connected to said trainer input-output means;
    a second central processing unit connected to said trainee input-output means;
    a third central processing unit for simulating various modes of operation of the electric power system;
    a first external memory accessible by each of said central processing units;
    a second external memory accessible by said second central processing unit;
    said central processing units providing means for executing a training review from the beginning of the training when a first command to restart the training is issued from the trainer input-output means and for executing another training item in response to a second command issued from the trainer input-output means designating conversion from the training review into another training item, during the execution of the training review.

2. A training simulator according to claim 1, wherein
    said first central processing unit controls said trainer input-output means for entering and issuing data including said first and said second commands;
    said third central processing unit is connected to the first and the second central processing units for executing a training item specified by a command given thereto; and
    wherein said training simulator further comprises a memory connected to said third central processing unit for storing the program of said training items.

3. A training simulator according to claim 1, wherein each of said input-output means is provided with a character display for displaying data on a screen and means including a light pen for selecting for execution one of said training items displayed on the screen.

* * * * *